J. B. CULLEN.
BRUSH HOLDER FOR MOTORS AND DYNAMOS.
APPLICATION FILED MAR. 4, 1912.
1,140,803.
Patented May 25, 1915.
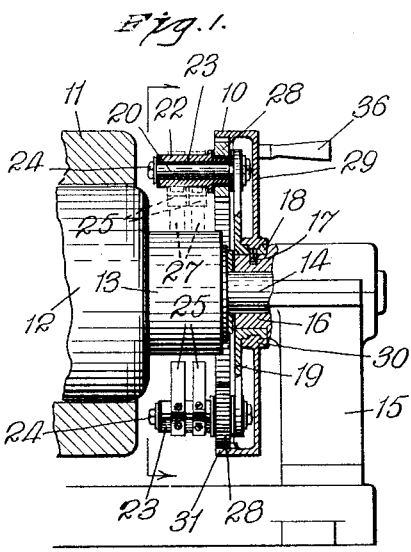
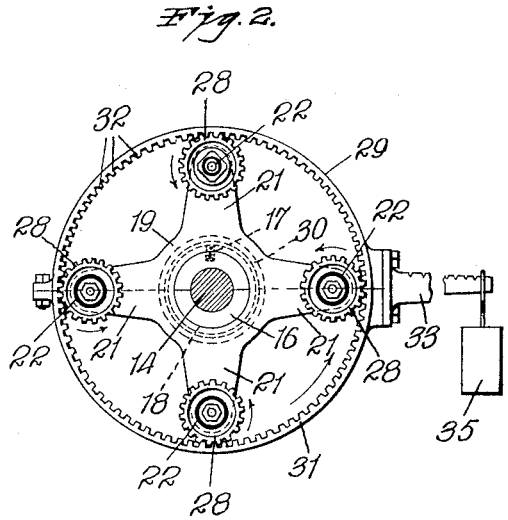
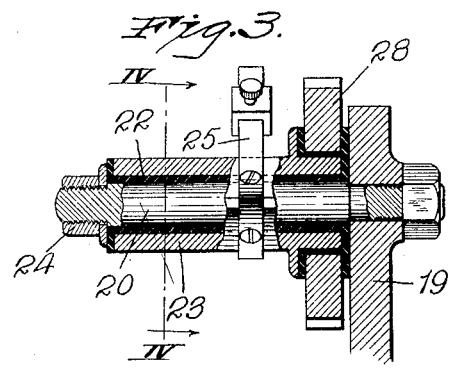
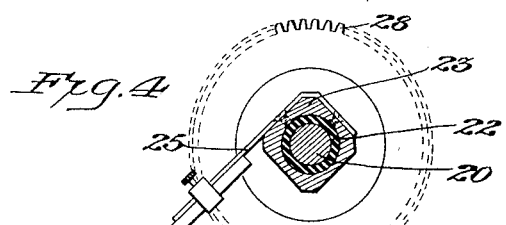
Witnesses:
Inventor
John B. Cullen
By his Attorney

UNITED STATES PATENT OFFICE.

JOHN B. CULLEN, OF NEW YORK, N. Y.

BRUSH-HOLDER FOR MOTORS AND DYNAMOS.

1,140,803.  Specification of Letters Patent.  Patented May 25, 1915.

Application filed March 4, 1912. Serial No. 681,337.

*To all whom it may concern:*

Be it known that I, JOHN B. CULLEN, a citizen of the United States, and a resident of New York, borough of Brooklyn, county of Kings, and State of New York, have invented a certain new and useful Improvement in Brush-Holders for Motors and Dynamos, of which the following is a full, clear, and exact specification.
This invention relates to a class of holders or devices adapted to be used in conjunction with motors and dynamos.

My invention has for its object primarily to provide a form of holder designed to be employed for carrying one or a plurality of brushes in a manner so as to properly contact with the commutator of a motor or dynamo for transmitting currents of electricity, and which is constructed to permit the brushes to be readily swung from engagement with the commutator in order to be cleaned as occasion requires, or replaced by new brushes when damaged or worn so as to be useless.
Another object of the invention is to provide means which serve to hold the brushes in yielding contact with the commutator of a motor or dynamo; and a further object of the invention is to provide an element adapted to be manually operated for throwing the brushes out of contact with the commutator at desired intervals.

A practical embodiment of the invention is represented in the accompanying drawing forming a part of this specification in which similar characters of reference indicate corresponding parts in all the views, the said invention being more fully described hereinafter and then pointed out in the appended claims.

In the drawing, Figure 1 is a fragmentary side view of a motor with one form of brush holder embodying my invention applied thereto, part of which is shown in section.
Fig. 2 illustrates a view showing the disk and gear of the holder with the nut and washer removed from the end of the supporting rod projecting from one arm of the spider, and Fig. 3 is an enlarged fragmentary sectional view of parts of the brush holder. Fig. 4, is a sectional view taken through the line IV—IV in Fig. 3.

The brush holder or device 10 is adapted to be applied upon the usual or any preferred form of motor, as 11, or a dynamo having an armature 12 and a commutator 13 which are held upon a shaft 14, said shaft being held in the journal-bearing 16 shown in Fig. 1, integral with the pedestal 15, which is provided upon the casing of the motor or dynamo. The journal-bearing 16, is laterally extended from the pedestal toward the casing and said extended part is of a diameter less than the journal-bearing and adapted to serve as a bearing for a spider 19. Upon the said extended part of the journal bearing 16 is rigidly held by one or more screws 17, or otherwise, the collar or boss 18 of a supporting element, or spider 19, which is adapted to carry one, or a plurality of studs, or rods 20. The supporting member, or disk 19 may be of any desired shape, but is preferably formed so as to be provided with a number of radially disposed arms 21, and said spider may be split, if desired, so as to be conveniently applied upon the sleeve 16. Each of the studs or rods 20 are arranged to project transversely from the proximity of the free ends of the arms 21 of the spider 19, and are disposed so as to be alined around the commutator 13, but spaced a suitable distance therefrom. Upon each of the studs or rods 20 is an insulating sleeve 22, and over each insulating sleeve is a square sleeve 23, the parts being held against movement upon the studs by nuts 24, or otherwise. To each of the sleeves 23 may be fastened one end of one or a plurality of arms 25 which are disposed at an angle with relation to the studs 20 so as to be disposed cross-wise over the peripheral surface of the commutator 13. Upon the opposite end of each of the arms 25 is connected a brush, as 27, which may be in the form of the usual block of carbon, and arranged so that the free ends thereof will be normally in contact with the peripheral surface of the commutator.

Upon each of the studs 20, and between the square sleeves 23 and the arms 21 of the spider 19 is a pinion 28. Each of the pinions 28 is in mesh with an operating element, or toothed wheel, or gear 29, which serves to control through the medium of said pinions the disk 19 for holding the brushes 27 in yielding engagement with the commutator 13, and also permitting the brushes to be swung from contact therewith, in order that the brushes may be cleaned, or repaired, or replaced by new ones when damaged. The operating element or gear 29 may also be split, in order to fit it upon the collar or boss 18 of the spider 19 in instances where it is not convenient to remove the bracket of a motor or dynamo for the purpose of applying the device upon the shaft thereof.

The operating element or toothed wheel 29 has a boss or collar 30 which is rotatably mounted in any preferred manner upon the collar or boss 18 of the spider 19, and said wheel as well as the collar 30 may also be split, in order to be fitted upon the collar or boss 18 in instances where it may not be convenient to remove the bracket of a motor or dynamo for the purpose of applying the device upon the shaft of the commutator. The wheel 29 has a concentric overhanging flange 31 at or near its peripheral edge, and the inner surface of said flange is toothed, at 32, with which the pinions 28 are in mesh, as above mentioned.

Extending from the peripheral edge of the operating element or gear 29 is an arm 33 which is disposed laterally with relation to the collar 30, and suspended from the end of said arm is a weight 35 which is adapted to be adjusted on the arm 33 so as to force the gear 29 and the spider 19 in a direction to swing the arms 25 for maintaining the brushes 27 in yielding contact with the commutator 13. Upon the face of the gear 29 opposite to the teeth 32 is a handle 36 which is adapted to be manually operated for rotating the gear 29 which in turn will revolve the pinions 28 for moving the spider 19 so as to swing the arms 25 and the brushes 27 from engagement with the commutator 13. The brushes 27 may then be readily cleaned in any desired manner, or repaired, or in event of being damaged one or more of them may be replaced by new brushes.

In the foregoing description I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof as defined in my claims.

Having thus described my invention, I claim as new and desire to secure by Letters Patent:—

1. An electrical machine with a commutator and a plurality of brush holders arranged circumferentially around the latter each holder of which is capable of a limited amount of rotation, a member for rotating the several holders concurrently, and gravitative means for holding the brushes in contact with the commutator yieldingly.

2. An electrical machine with a commutator and brush holders each of which is provided with a pinion, a gear in mesh with the several pinions, and adjustable means for holding the gear movable against variable degrees of resistance.

3. An electrical machine provided with a commutator, a spider rotatable coaxially with the commutator, brush holders each of which is provided with a pinion rotatable in the arms of the spider, an internally toothed gear in mesh with the said pinions, an arm extending from the said gear, and a weight movable on the said arm for imparting different degrees of pressure of the said brushes on the commutator.

This specification signed and witnessed this 2nd day of March A. D., 1912.

JOHN B. CULLEN.

Witnesses:
A. E. Bogue,
E. M. Jerke.

Copies of this patent may be obtained for five cents each, by addressing the "Commissioner of Patents, Washington, D. C."